United States Patent [19]

Nerowski et al.

[11] Patent Number: 5,034,675
[45] Date of Patent: Jul. 23, 1991

[54] POLYPHASE MACHINE FED BY A PULSE-CONTROLLED A.C. CONVERTER

[75] Inventors: Georg Nerowski, Lauf; Bernhard Piepenbreier, Hemhofen; Hans-Juergen Toelle, Erlangen, all of Fed. Rep. of Germany

[73] Assignee: Siemens Aktiengesellschaft, Berlin & Munich, Fed. Rep. of Germany

[21] Appl. No.: 569,385

[22] Filed: Aug. 15, 1990

Related U.S. Application Data

[63] Continuation of Ser. No. 320,395, Mar. 8, 1989, abandoned.

[30] Foreign Application Priority Data

Mar. 21, 1988 [DE] Fed. Rep. of Germany ....... 3809446

[51] Int. Cl.$^5$ ............................................. H02P 5/40
[52] U.S. Cl. ..................................... 318/811; 318/808
[58] Field of Search .................... 318/803, 807–811; 368/721–723

[56] References Cited

U.S. PATENT DOCUMENTS

| | | | |
|---|---|---|---|
| 3,297,926 | 1/1967 | Campbell et al. | 318/721 |
| 4,047,083 | 9/1977 | Plunkett | 318/807 |
| 4,091,294 | 5/1978 | Zankl et al. | 318/808 |
| 4,333,042 | 6/1982 | Kawada et al. | 318/811 |

FOREIGN PATENT DOCUMENTS 3345271 12/1983 Fed. Rep. of Germany.

Primary Examiner—David Smith, Jr.
Attorney, Agent, or Firm—Kenyon & Kenyon

[57] ABSTRACT

A polyphase machine fed by a pulse-controlled a.c. converter in which the current is controlled between rectangular and sine-shaped waveforms in each half cycle according to the required torque. Independently of the current control, the active number of phase windings is reduced as a function of the rotational speed of the machine.

2 Claims, 2 Drawing Sheets

POLYPHASE MACHINE FED BY A PULSE-CONTROLLED A.C. CONVERTER

This application is a continuation of application Ser. No. 07/320,395 filed Mar. 8, 1989 now abandoned.

FIELD OF THE INVENTION

The present invention relates to a polyphase machine fed by a pulse-controlled a.c. converter. The machine has a divisible number of phase windings and a number of slots.

BACKGROUND OF THE INVENTION

A known type of polyphase machine is the specially designed, permanently energized synchronous machines. In machines controlled by pulse-controlled a.c. converters, a known method described in German Patent 33 45 271 seeks to improve efficiency when the rotational frequency diminishes. In this method, the phases are subdivided into phase sections and the series connection of the individual phase sections are increased until all the phase sections of each phase are connected in series. By doing this, the number of actively dissipative frequency converters can be reduced to one. On the other hand, with higher rotational frequencies (rated speed) and greater torques (rated-load torque), all the phase sections are connected in parallel. Therefore, the determining phase winding number m and the number of slots q remains unchanged.

At a rated speed $n_N$, a correspondingly high rotary voltage is induced, whereby all m phase windings are switched in parallel through their frequency converters to the supplying direct-current mains. With diminishing rotational speeds $n<n_N$, the induced voltage declines approximately in the ratio $n/n_N$, and increasingly the phase windings are switched from parallel operation over to series operation.

As a result of this switching-over of more and more phase windings from parallel to series operation, the number of phase windings finally decreases to m*. The active number of slots therefore climbs to q*, according to the relation $m \cdot q = m^* \cdot q^*$. By switching over to series operation, using the known method, fewer losses occur as a result of the reduction of the number of frequency converters remaining in operation, and thereby a better efficiency factor is achieved.

Low-loss bistable circuit elements, such as thyristors which can be activated after time delays, are effective to further reduce losses when switching the frequency converters.

There is, however, a need to provide a polyphase machine that improves the efficiency factor to a greater extent than in the prior art, and runs with minimum process noise and small oscillating torques.

SUMMARY OF THE INVENTION

The above need is filled by the present invention which provides a polyphase machine fed by a pulse-controlled a.c. converter having a divisible number of phase windings m, where $m \geq 4$. The a.c. converter is coupled to the phase windings of the machine. The machine has m phase windings and a number of slots q. The converter has a current controller coupled to the machine phase windings to adjust the torque of the machine by changing the current waveform so that the maximum value of the current in each half-cycle corresponds to a permissible load capacity of the frequency converter. Control of the average current is accomplished by adjusting a waveform of the current to be rectangular or sinusoidal in dependence on the torque of the machine.

The influence of the moment of rotation (torque), which is independent of the influence of the rotation speed, is accomplished through the corresponding regulation of the current waveform in each half cycle. In the process, the maximum value of the current is adjusted to correspond to the permissible load capacities of the elements of the frequency converter.

In order to better utilize the machine, at a rated-load torque $M_N$ and at slightly smaller torques $M \approx M_N$, during each half-cycle an adjustment of the current waveform is made. For higher torques, the adjusted waveform should have an amplitude remaining as constant as possible, such as rectangular or trapezoidal. Thereby, to obtain a given average value of current necessary for the rated-load torque, a correspondingly longer period at a lower maximum value is used as compared to a sine-shaped current-waveform. This makes it possible to use power electronic elements with lower permissible load capacities for the frequency converters. With a rectangular or trapezoidal current waveform, a higher number of phases m will result in less oscillating torques and less noise-stimulating radial forces.

With smaller torques $M<M_N$, the current waveform can be sine-shaped because the maximum current is decreased. As a result, noise stimulation and the oscillating torques are substantially eliminated.

Switching over from one current waveform to another and changing the maximum current value in each half-cycle can be accomplished by continuously or gradually influencing the nominal value of the current, with a minimum of a single step.

DETAILED DESCRIPTION

Figure 1:
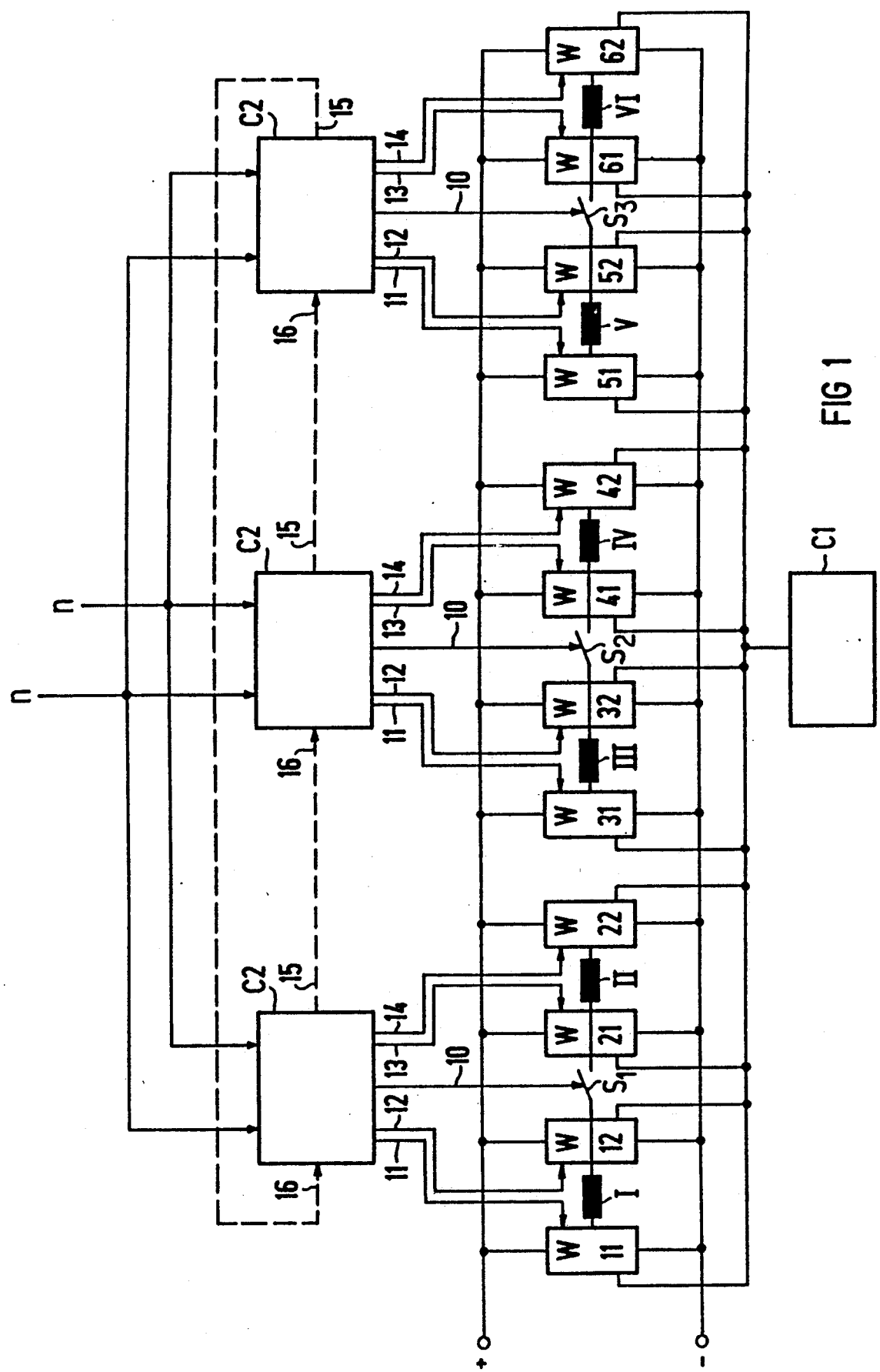
FIG. 1 shows the schematic coupling of a mechanical winding with the pulse-controlled a.c. converters and the direct-current mains, according to the present invention.

FIG. 1 illustrates a permanently energized synchronous machine with $m=6$ phase windings, which are not subdivided. The number of slots is $q=1$. The machine has a separate phase winding supply over pulse-controlled a.c. converters in bridge connection from a direct-current mains.

Individual phase windings I,II,III,IV,V and VI are each connected to the direct-current mains NE via two each half-bridges W11,W12;W21,W22;W31,W32;W41,W42;W51,W52 and W61,W62 of six pulse-controlled a.c. converters.

One half-bridge from each of two phase windings can be coupled to each other through bistable circuit elements S1, S2 and S3, e.g., thyristors. With the corresponding control of the individual circuit elements, a series connection of each of two phase windings I and II, III and IV, or V and VI results.

The adjusting of the current waveform is controlled by a current controller C1. Such a controller is commercially available. The current controller C1 adjusts the current waveform between rectangular or trapezoidal and sinusoidal shapes, depending on the required torque.

Coupling controllers C2 are coupled to the three circuit elements S1, S2 and S3 and sense the rotational speed of the machine. Depending on the sensed speed, the coupling controllers C2 will open or close one or more of the circuit elements S1, S2 or S3.

When all three circuit elements S1, S2, S3 are closed, an effective number of phases $m^*=3$ is attained, instead of the original number of phases $m=6$ when circuit elements S1, S2, S3 are open.

Figure 2:
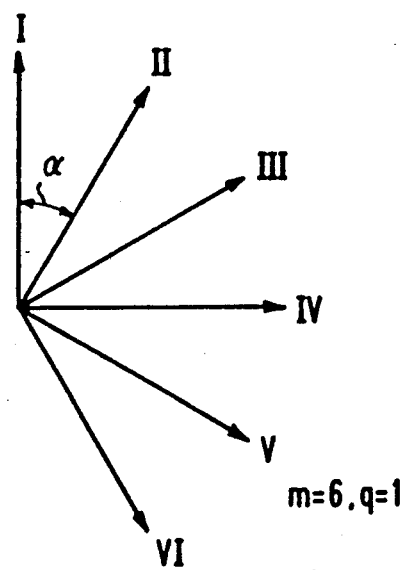
FIGS. 2 and 3 illustrate the position of the magnetic axes when $m=6$ and $m^*=3$.
Figure 3:
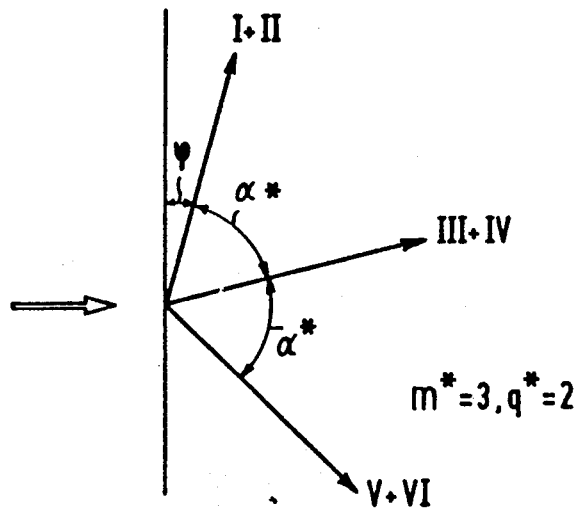

The position of the magnetic axis when $m=6$ according to FIG. 2 has an axial angle of $\alpha=\pi/m$. Now assume that the phase circuitry has an unchanged line voltage and a rotational speed of $n \approx \frac{1}{2}n_N$, but the number of effective phases is changed to $m^*=3$. This is done by supplying power to all of the circuit elements S1, S2, S3 and by blocking the half-bridges W12, W21, W32, W41, W52 and W61. As seen in FIG. 3, this reduction in the number of effective phases results in enlarged axial angles $\alpha^*=\pi/m^*$. The currents in the three effective new phases become displaced by the angle $\phi$ in relation to the previous magnetic axis of the original phases, whereby the relationship $$\phi = (q^* - 1)\frac{\pi}{2m^*q^*}$$

applies.

Figure 4:
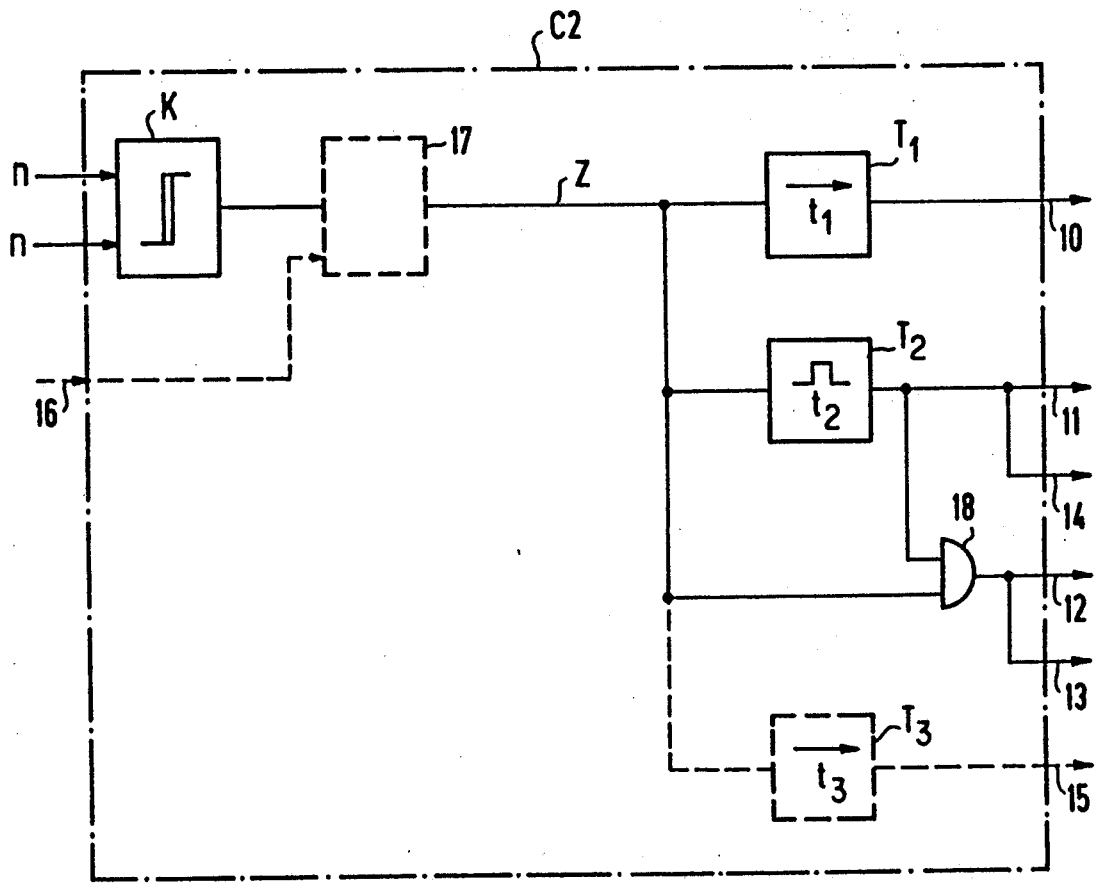

FIG. 4 shows a circuit diagramm of a coupling controller C2. This controller C2 has a comparator K to whose first input the actual speed value $n_{ist}$ of the machine and to whose second input a speed setpoint $n_{soll}$ is applied. The speed setpoint $n_{soll}$ determines a speed at which switching of the circuit elements S1, S2, S3 is to be effected.

The comparator K is followed by first and second time delay elements T1 and T2. If required a third time delay element T3 may also be provided, as indicated by the dotted line. There is further provided an OR stage 18 to whose first input the comparator signal Z and to whose second input the output signal of the second time delay element T2 is applied.

The coupling controller C2 works as follows: when the actual speed value $n_{ist}$ exceeds or falls below the speed setpoint $n_{soll}$ the comparator signal Z is changed. When the comparator signal Z changes, for example, from LOW to HIGH the first time delay element T1 is triggered to yield a control signal, after the set delay time, said control signal transfering the respective circuit element S1 or S2 or S3 into the ON state. When the signal Z is in the HIGH state, the second time delay element T2 blocks the control pulses for the half bridges W11 and W22 or W31 and W42 or W51 and W62 connected to the outputs 11 and 14 in accordance with the time delay set. The time delay of the second time delay element T2 is greater than the sum of the time delay of the first time delay element T1 and the switching time of the respective circuit element S1 or S2 or S3. This thus ensures that the circuit elements S1, S2, S3 switch off-load.

On completion of the time delay set for the second time delay element T2, the control pulses are enabled and the half bridges connected to the outputs 11 and 14 are controlled again. The half bridges W12 and W21 or W32 and W41 or W52 and W61 connected to the outputs 12 and 13 of the OR stage 18 are blocked for the time in which signal Z of the comparator K is in the HIGH state or a blocking signal is present at the output of the second time delay element T2. Thus during the HIGH state of the signal Z of the comparator K there is a series connection of the winding phases I and II or III and IV or V and VI.

When the signal Z changes to the LOW state, the respective switching element S1 or S2 or S3 is switched through the time delay element T1 into the OFF state, whereby the half bridges W11 to W62 are blocked or held in the blocked state during switching of the circuit elements S1, S2, S3 through the second time delay element T2 and the OR stage 18 so that the circuit elements S1, S2, S3 are switched off-load. The half bridges W11 to W62 connected to the outputs 11 and 14 of the second time delay element T2 as also to the outputs 12 and 13 of the OR stage 18 are enabled so that all the half bridges are controlled again. All the winding phases I to VI are thus connected in parallel.

To prevent torque-free intervals the individual coupling controllers C2 can be controlled as a function of the switching state of the other respective coupling controllers so that the circuit elements S1, S2, S3 and the half bridges W11 to W62 are correspondingly controlled in sequence. Such a control of the sequence of the coupling controllers C2 is facilitated by the third time delay element T3. The signal at the output 15 of the latter is supplied to the input 16 of the next respective coupling controller C2. This signal controls a stage 17 which enables the signal Z coming from the comparator K only when there is a signal at the output 15 of the third time delay element T3 of the respective previous coupling controller C2. Control of the switching sequence of the circuit elements S1, S2, S3 is thus provided.

What is claimed is:

1. An arrangement comprising:
   a polyphase machine having a divisible number of phase windings m, where $m \geq 4$, and a number of slots q;
   switchable couplings arranged between at least two of the phase windings which switchably couple the phase windings in series;
   a main voltage supply having one positive and one negative terminal;
   a first and second series of half-bridges, each of said half-bridges coupled between the positive and negative terminals of said main voltage supply, each of said phase windings being coupled between one of said first series and one of said second series of half-bridges, wherein each of said first series of half-bridges are coupled between one of said phase windings and one of said switchable couplings;
   an a.c. converter coupled to the phase windings and the half-bridges of the machine, the converter having a current controller which adjusts the torque of the machine by changing a current waveform to be rectangular or sinusoidal in dependence on the torque of the machine such that the maximum value of the current in each half-cycle corresponds to a permissible load capacity of the a.c. converter, and further having a coupling controller coupled to the switchable couplings which controls the switchable couplings in dependence on the rotational speed of the machine, whereby the number of phase windings m is effectively divided into $m^*$ effective phase windings and the number of slots q is multiplied into $q^*$ slots, with the product of $m \cdot q$ equal to the product of $m^* \cdot q^*$ and is constant, said coupling controller further being coupled to said half-bridges which controls said half-bridges by blocking said first half-bridges in dependence on the rotational speed of the machine.

2. The arrangement of claim 1, wherein the switchable couplings are low-loss, bistable circuit elements.

* * * * *